United States Patent
Zanotelli et al.

(10) Patent No.: US 9,348,402 B2
(45) Date of Patent: May 24, 2016

(54) MULTIPLE CRITICAL PATHS HAVING DIFFERENT THRESHOLD VOLTAGES IN A SINGLE PROCESSOR CORE

(71) Applicant: QUALCOMM Incorporated, San Diego, CA (US)

(72) Inventors: Joseph Victor Zanotelli, San Diego, CA (US); Martin Saint-Laurent, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 491 days.

(21) Appl. No.: 13/771,075

(22) Filed: Feb. 19, 2013

(65) Prior Publication Data

US 2014/0237275 A1   Aug. 21, 2014

(51) Int. Cl.
 *G11C 16/04*  (2006.01)
 *G06F 1/32*   (2006.01)

(52) U.S. Cl.
 CPC ........... *G06F 1/3243* (2013.01); *Y02B 60/1239* (2013.01)

(58) Field of Classification Search
 CPC .. G11C 16/0483; G11C 5/14; G11C 11/1697; G11C 16/04; G11C 16/34
 See application file for complete search history.

(56) References Cited

U.S. PATENT DOCUMENTS

| | | | |
|---|---|---|---|
| 6,238,982 B1 | 5/2001 | Krivokapic et al. | |
| 6,380,764 B1 * | 4/2002 | Katoh et al. | 326/93 |
| 7,155,621 B2 | 12/2006 | Dai | |
| 7,197,733 B2 | 3/2007 | Issa et al. | |
| 7,962,770 B2 | 6/2011 | Capps, Jr. et al. | |
| 2001/0028258 A1 * | 10/2001 | Jeon | 326/98 |
| 2003/0218231 A1 * | 11/2003 | Sani et al. | 257/500 |
| 2006/0094229 A1 * | 5/2006 | Ema et al. | 438/624 |
| 2008/0229058 A1 | 9/2008 | Le et al. | |
| 2013/0019120 A1 | 1/2013 | Salsbery et al. | |

OTHER PUBLICATIONS

Kobayashi, et al., "Self-adjusting threshold-voltage scheme (SATS) for low-voltage high-speed operation", IEEE Custom Integrated Circuits Conference, 1994, pp. 271-274.
Suzuki, et al., "A 300MIPS/W RISC Core Processor with Variable Supply-Voltage Scheme in Variable Threshold-Voltage CMOS", IEEE Custom Integrated Circuits Conference, 1997, pp. 587-590.

* cited by examiner

*Primary Examiner* — Mohammed Rehman
*Assistant Examiner* — Alyaa T Mazyad
(74) *Attorney, Agent, or Firm* — Haynes and Boone, LLP (57) ABSTRACT

A processor having a multi-Vt critical path is provided that includes both low-Vt devices and high-Vt devices. If the processor is operating in a high performance mode, the multi-Vt critical path is controlled so as to use the low-Vt devices. Conversely, if the processor is operating in a low power mode, the multi-Vt critical path is controlled so as to use the high-Vt devices. In this fashion, the complication of multiple processing cores is avoided in that a single processor core can operate in both the high performance mode and in the low power mode.

15 Claims, 5 Drawing Sheets

MULTIPLE CRITICAL PATHS HAVING DIFFERENT THRESHOLD VOLTAGES IN A SINGLE PROCESSOR CORE

TECHNICAL FIELD

This application relates to processors, and more particularly to a processor with multiple critical paths having different threshold voltages.

BACKGROUND

In a processor, the module that reads and executes instructions is referred to as a central processing unit (CPU). Each CPU thus includes a processing "core" in that it is the core unit that executes the instructions. A modern device such as a cellular phone may include a number of embedded processors in its integrated circuits such as an application processor or a digital signal processor (DSP). Although the processing capability of such embedded processors continues to grow considerably, their power consumption is becoming a leading design constraint. Users desire high performance but achieving that goal is at odds with keeping power consumption low. To meet the conflicting goals of high performance and low power consumption, it is known to provide two or more processor cores within a single processor. One processor core is designed for high performance at the cost of high power consumption whereas a remaining core is designed for low power consumption at the cost of low performance. This solution is commonly referred to as a "Big Little" design. Having both cores allows the operating system to use the low power core during idle times or periods of little processor demand. The operating system can then switch to the high performance core during periods of high processor demand.

The high performance core comprises transistors having relatively low voltage thresholds (low-Vt) because low-Vt transistors can be switched on and off at the high switching speeds necessary to achieve high performance The high performance core may thus also be denoted as a low-Vt core. But the leakage current for low-Vt transistors is markedly increased as compared to high threshold voltage (high-Vt) transistors. Thus, the low speed core uses high-Vt transistors to decrease the leakage current and thus decrease the power consumption. The low speed core may thus be also referred to as a low power high-Vt core. The high-Vt transistors have relatively slow switching speeds, which leads to the decreased performance for the high-Vt core.

There are several problems with using both a high-Vt core and a low-Vt core. For example, the duplicate cores require substantial die area, which increases cost. In addition, the powering down of one core and the powering up of the other core requires substantial overhead and time, which lowers performance and demands power. A system that frequently switches between cores would thus be inefficient and suboptimal. Therefore, it is conventional to design the operating system to remain on the low power core for short workloads that could instead be performed by the high performance core but for the switching overhead. A multi-core processor is thus stymied from taking advantage of its capabilities in such circumstances.

Accordingly, there is a need in the art for improved processor designs that can achieve high performance while minimizing power consumption.

SUMMARY

A processor having a multiple instantiations of a critical path is provided. A high performance instantiation of the critical path comprises devices configured for high switching speed but also relatively high leakage current. A low power instantiation uses devices configured for relatively low switching speed and relatively low leakage current. If the processor is operating in a high performance mode, a CPU within the processor uses the high performance critical path. Conversely, if the processor is operating in a low power mode, the CPU uses the low performance critical path. In this fashion, the complication of multiple processing cores is avoided in that a single processor core can operate in both the high performance mode and in the low power mode.

The transistors and other semiconductor devices used within the high performance critical path may have relatively short channel lengths as compared to the channel lengths for the devices used within the low power critical path. Alternatively, low-Vt devices (having a relatively thin gate oxide) may be used to construct the high performance critical path. In contrast, high-Vt devices (having relatively thick gate oxide) maybe used to construct the low power critical path.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

To meet the need in the art for a single processing core to have high performance when needed yet low leakage during periods of lowered processing demands, a single core processor is disclosed that has the same critical path instantiated as both a high performance critical path and also a low power critical path. The processor core is configured to use the high performance critical path during a high performance mode in which the processor core processes instructions responsive to a high speed clock. The processor core is also configured to use the low power critical path during a low power mode in which the processor core processes instructions responsive to a low speed clock. Because there is a single processor core, there is no wasted power and time in switching one core off and the other on when switching performance modes. The single core processor is controlled by an operating system that determines whether to run the processor core in a low power operating mode or a high performance operating mode. As used herein, the terms "processor core" and "CPU" will be used interchangeably.

To achieve these dual modes of operation, the single core processor includes the two instantiations of its critical path. As known in the processor arts, the critical path determines the maximum clock rate in that the critical path takes the longest amount of time to finish processing between successive clock cycles. If the clock rate is too fast, the signal propagation through the critical path cannot be finished in one clock cycle. The clock rate must thus be slow enough to accommodate the delay in the critical path.

The multiple instantiations of the critical path are all within a single processor core. Because these critical paths are all within a single core, the design and performance issues discussed above with regard to multi-core processors are avoided. Since the same critical path is instantiated as both a high performance critical path and a low performance critical path, the dual instantiations are denoted herein as a multi-mode critical path. The high performance critical path comprises transistors and other semiconductor devices having relatively short channel lengths as compared to the channel lengths for the devices used within the low power critical path. Alternatively, low-Vt devices (having a relatively thin gate oxide) may be used to construct the high performance critical path. In contrast, high-Vt devices (having relatively thick gate oxide) maybe used to construct the low power critical path. In other embodiments, both the channel length and the gate oxide thickness may be varied. The following discussion is directed to embodiments in which the high performance critical path comprises low-Vt devices and the low power critical path comprises high-Vt devices. The multi-mode critical path in such embodiments is referred to herein as a multi-Vt critical path. The high performance critical path in a multi-Vt critical path embodiment may thus be also be denoted as a low-Vt critical path. Similarly, the low power critical path in a multi-Vt critical path embodiment may be denoted as a high-Vt critical path. However, it will be appreciated that the scope of the structures and methods disclosed herein includes embodiments in which just the channel length is varied as opposed to the gate oxide thickness.

Because it comprises low-Vt devices, datapath propagation through the low-Vt critical path is relatively fast. In contrast, the high-Vt devices in the high-Vt critical path minimize leakage current losses but have slower switching rates. In one embodiment, the multiple instances of the critical path use separate logic gates such that the high performance path can be powered down and isolated in the low power mode. Similarly, the low power critical path would be powered down in the high performance mode. In an alternative embodiment, a multi-Vt critical path is provided that uses dual-mode logic cells. Each dual-mode logic cell is configured to use low-Vt transistors during the high performance mode of operation and to use high-Vt transistors during the low power mode of operation.

The following discussion assumes that a designer has identified the critical path in the CPU. The identification of the critical path(s) is typically performed on a CPU design during the simulation phase. After proposing a particular arrangement of the various hardware components such as registers, arithmetic logic units (ALUs), shifters, and logic gates, software tools such as SPICE enable a designer to identify the critical path. Knowing the timing delay through a critical path is fundamental in setting the processor clock rate. The clock cycle cannot end faster than the delay through the critical path. Because critical path identification and analysis is well-known to those of ordinary skill in the processor arts, the following discussion assumes that such an analysis has been performed and the critical path(s) identified.

Figure 1:
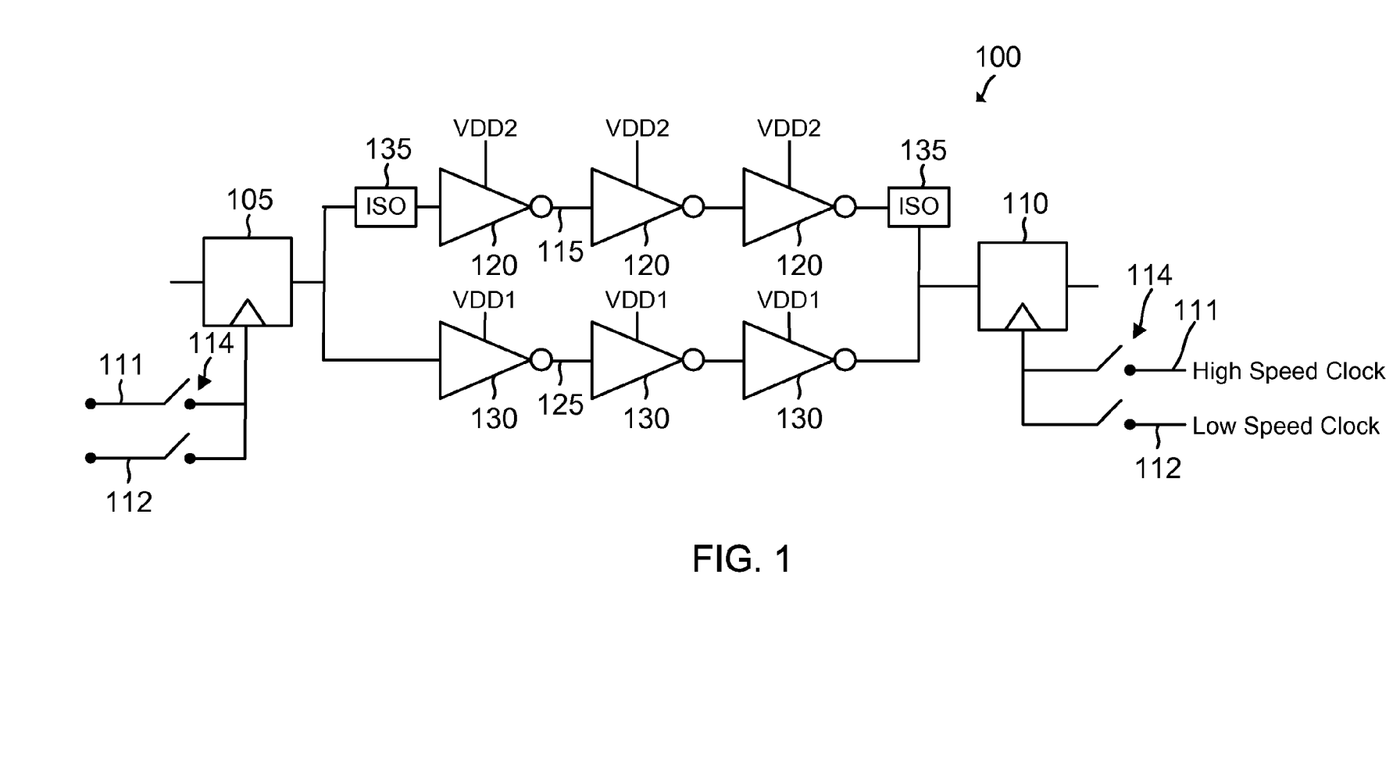
FIG. 1 is a schematic diagram of a multi-Vt critical path comprising separate high-Vt and low-Vt logic gates.

Turning now to the drawings, a multi-Vt critical path 100 is shown that includes a high performance critical path 115 and a low power critical path 125. Path 100 begins at an initial storage cell such as a flip-flop 105 and ends at a final storage cell such as a flip-flop 110. At the beginning of a clock cycle, multi-Vt critical path 100 receives the signal to be processed from initial flip-flop 105. Thus, the signal provided by flip-flop 105 must propagate through all the devices in path 100 within that clock cycle so that final flip-flop 110 may register the processed signal accordingly. Initial flip-flop 105 and final flip-flop 110 are clocked in the high performance mode by a high performance/high speed clock 111. In contrast, initial flip-flop 105 and final flip-flop 110 are clocked in the low power mode by a low speed clock 112 that cycles relatively slowly as compared to high speed clock 111. Depending upon the operating mode, the clocks may be selected through, for example, switches 114. An operating system for the processor (see FIG. 4) including critical path 100 includes logic for determining whether the high performance or low power mode should be selected. Switches 114 would then be driven accordingly.

A single clock source (not illustrated) may drive both high speed clock 111 as well as low speed clock 112. Thus, a single clock tree may be used for both clocks. Such a single clock source is configured to cycle faster or slower as necessary to drive high speed clock 111 and low speed clock 112. Alternatively, clocks 111 and 112 may each by produced by separate dedicated clock sources and driven into their own corresponding clock tree.

Multi-Vt path 100 includes a high performance low-Vt critical path 115 that is selected during the high performance mode. The logic gates and devices within low-Vt path 115 are represented by three low-Vt logic gates 120 (which are shown as inverters). However, it will be appreciated that such a representation is merely exemplary. In practice, the type and number of logic gates and other devices are dictated by the needs of the particular processor being implemented. As discussed above, the specific hardware within a critical path may include such devices as registers, ALUs, various logic gates, and shifters. A designer cannot be certain of the specific devices within the critical path for a given processor design until simulation results identify it. Thus, low-Vt logic gates 120 represent these implementation-specific devices. Regardless of the specific hardware within low-Vt path 115, the included devices comprise relatively small, thin-gate-oxide, low-Vt transistors. Such transistors can cycle at relatively fast rates. Thus, low-Vt logic gates 120 comprise low-Vt transistors so that low-Vt critical path 115 can complete the processing of the input signal from initial flip-flop 105 within a single clock cycle of the relatively fast high speed clock 111 used in the high performance mode. Gates 120 are powered by a voltage rail VDD2 that is powered down when the high performance mode is inactive. To prevent any current loss into low-Vt critical path 115 during the low power mode, path 115 may be separated from flip-flops 105 and 110 by isolation circuits 135 (for example, transmission gates). Isolation circuits 135 are controlled so as to isolate low-Vt path 115 from the remainder of multi-Vt critical path 100 during the low power mode and to couple path 115 into critical path 100 during the high performance mode.

In contrast to high performance path 115, a low power high-Vt path 125 uses high-Vt transistors for its high-Vt logic gates 130. Thus, high-Vt critical path 125 has reduced leakage current as compared to low-Vt path 115. If any devices in high-Vt critical path 125 are clocked, these components are clocked according to the relatively slow clock 112 used during the low power mode. For example, any registers in high-Vt critical path 125 would be clocked by low speed clock 112. Similarly, any clocked components in low-Vt critical path 115 are clocked according to the relatively fast high speed clock 111 used during the high performance mode. A power rail VDD1 for high-Vt critical path 125 that supplies power during the low power mode is powered down during the high performance mode.

Figure 2:
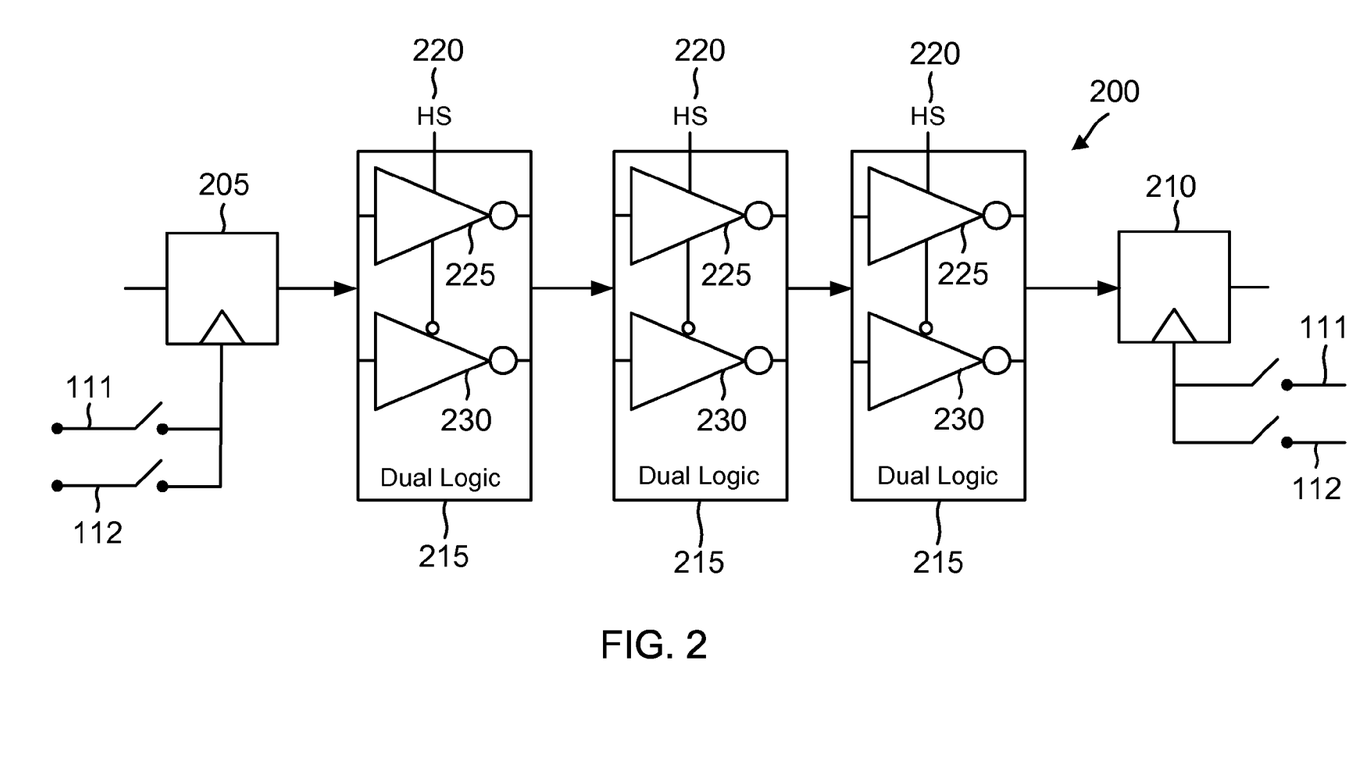
FIG. 2 is a schematic diagram of a multi-Vt critical path comprising dual-mode logic gates.

Paths 115 and 125 have separate logic gates 120 and 130, respectively, with corresponding separate power supplies. High-Vt critical path 125 and low-Vt critical path 115 are thus physically separate paths. An alternative embodiment for a multi-Vt critical path 200 is shown in FIG. 2. Rather than use two separate paths, multi-Vt critical path 200 uses a single path formed by dual-mode logic gates 215 that function as both high performance gates and low power gates. Analogous to multi-Vt critical path 100 discussed previously, multi-Vt critical path 200 extends between an initial flip-flop 205 and a final flip-flop 210. Each dual-mode logic gate 215 operates as a high performance (low-Vt) gate 225 in the high performance mode and as a low power (high-Vt) gate 230 in the low power mode. An example dual-mode logic gate 215 may be implemented as shown in FIG. 3.

Figure 3:
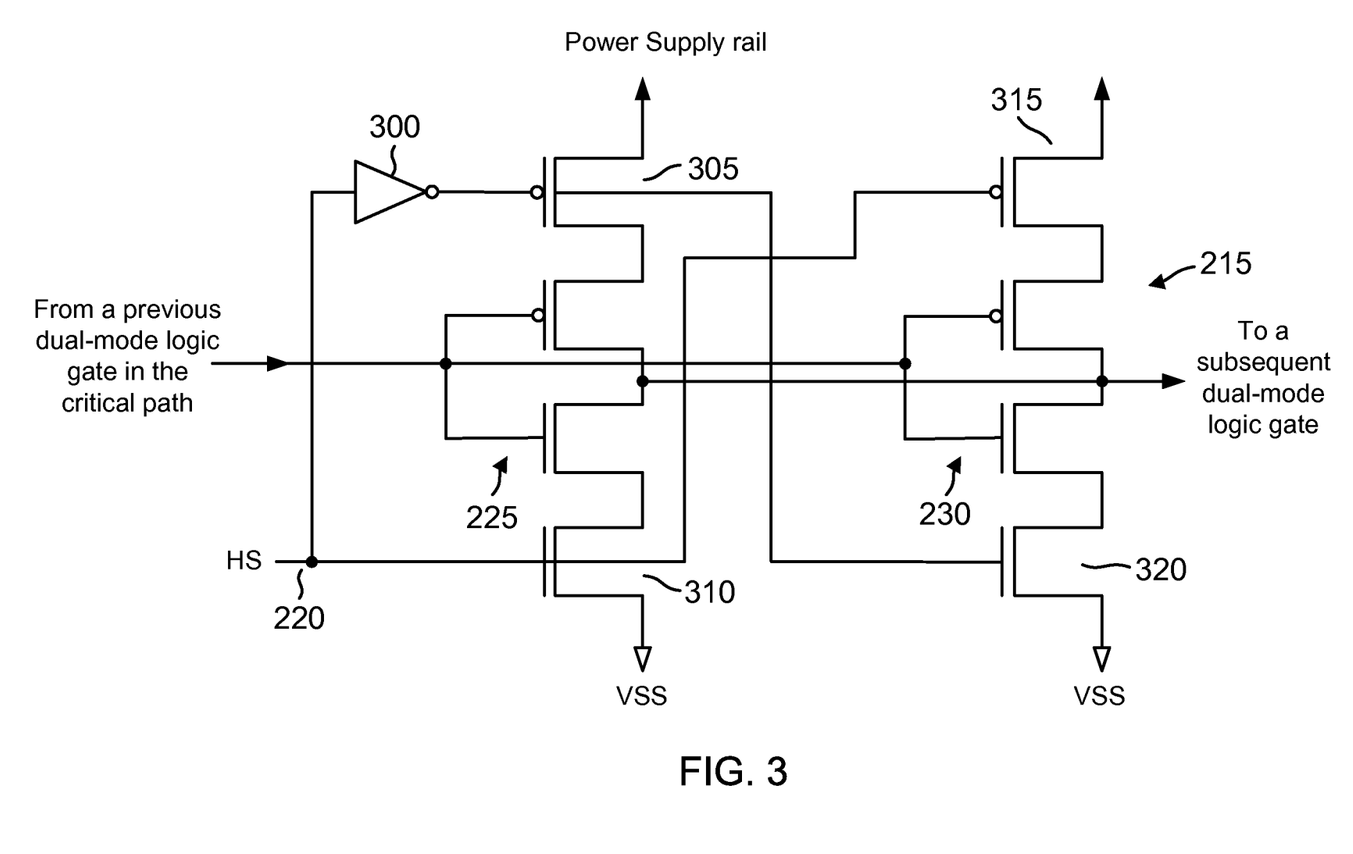
FIG. 3 is a schematic diagram of a dual-mode logic gate in accordance with an embodiment.

In the example dual-mode logic gate embodiment of FIG. 3, each low-Vt gate 225 and high-Vt gate 230 comprises an inverter but it will be appreciated that the actual type of logic gates within dual-mode logic cell 215 depends upon the needs of the particular processor being implemented as discussed above with regard to logic gates 120 and 130 for critical path 100 of FIG. 1. In that regard, the type and arrangement of devices in a critical path will depend upon the particular processor design being implemented. As the processor is being designed, the critical path may be identified through simulation, whereupon the actual devices within the critical path may be identified. In the embodiment of FIG. 3, a mode control signal 220 controls whether dual-mode logic gate 215 operates using gate 225 or gate 230. For example, mode control signal 220 may be received at an inverter 300 having an output driving a gate of a PMOS transistor 305. The source of PMOS transistor 305 is coupled to a power supply rail and its drain couples to high performance (low-Vt) gate 225. When mode control signal 220 is asserted in the high performance mode, PMOS transistor 305 is switched on so as to supply power to high performance gate 225. Similarly, mode control signal 220 drives a gate of an NMOS transistor 310 that couples between high performance logic gate 225 and ground. Thus, when mode control signal 220 is asserted, current can flow from the power supply rail through high performance gate 225 into ground. High-Vt gate 230 is coupled between an analogous PMOS transistor 315 and an analogous NMOS transistor 320. However, mode control signal 220 directly drives a gate for PMOS transistor 315 without inversion. In contrast, mode control signal 220 drives a gate for NMOS transistor 320 through inverter 300. Thus, high-Vt gate 230 is operational when mode control signal 220 is de-asserted to select for the low power mode for multi-Vt critical path 200.

Analogous to gates 120 and 130, high performance (low-Vt) gates 225 comprise low-Vt transistors whereas low power (high-Vt) gates 230 comprise high-Vt transistors. Any clocked devices in the high performance mode for multi-Vt critical path 200 are clocked by high speed clock 111 (FIG. 1) whereas any clocked devices are clocked by low speed clock 112 in the low power mode. Because high performance gates 225 comprise low-Vt devices, multi-Vt critical path 200 can finish processing within the relatively fast cycles of high speed clock 111 in the high performance mode as selected by mode control signal 220. On the other hand, multi-Vt critical path 200 has low leakage in the low power mode. Clock buffers (not illustrated) to any clocked components such as to final flip-flop 210 may be instantiated using dual-mode buffer cells constructed analogously as discussed with regard to dual-mode logic cell 215.

Figure 4:
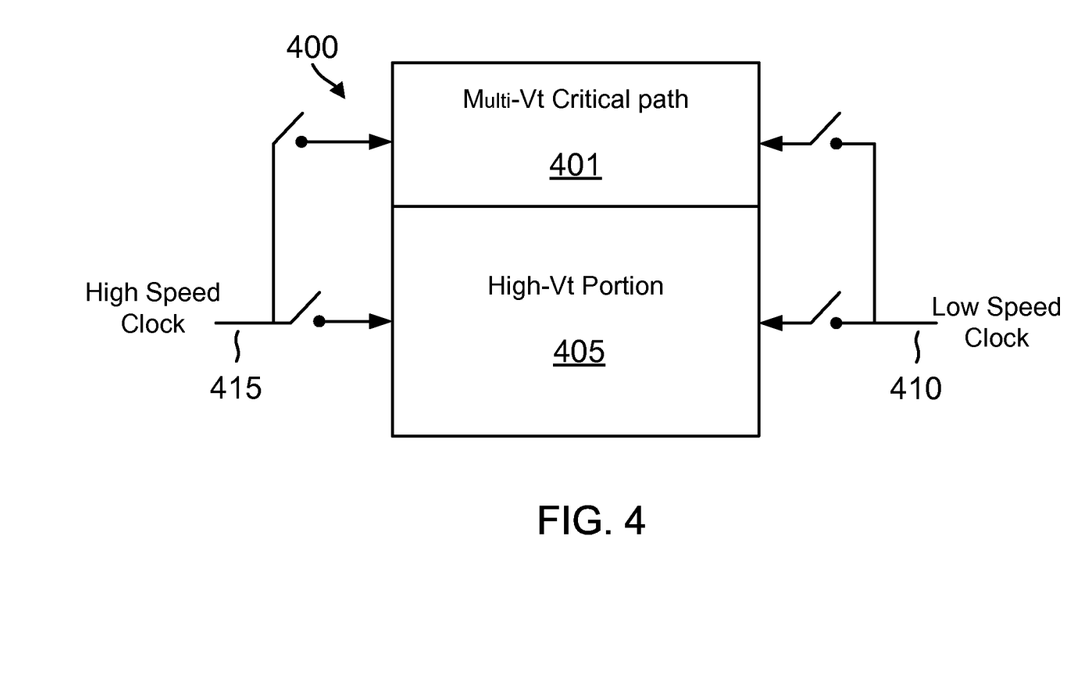
FIG. 4 is a block diagram of a processor including a multi-Vt critical path.

Regardless of whether separate logic gates/paths or dual-mode logic gates are implemented, a multi-Vt critical path functionality results. In the low power mode, the processor's critical path (or paths) is carried on high-Vt devices. In contrast, the same critical path functions on low-Vt devices in the high performance mode. A processor core or CPU 400 including a multi-Vt critical path 401 is shown in FIG. 4. The bulk of processor core 400 comprises a high-Vt portion 405 constructed with high-Vt transistors so as to reduce leakage and power consumption. High-Vt portion is active in both the low power mode and in the high performance mode. The various signal paths that extend through high-Vt portion 405 have relatively little delay such that they can accomplish their necessary processing within the relatively fast clock cycle of a high speed clock 415 despite the use of high-Vt transistors. Thus, in the high performance mode, high-Vt portion 405 is clocked responsive to high speed clock 415. Conversely, high-Vt portion 405 is clocked responsive to a low speed clock 410 in the low power mode. In the low power mode, multi-Vt critical path 401 operates on its high-Vt devices. Conversely, in the high performance mode, multi-Vt critical path 401 uses its low-Vt devices. Thus, processor core 400 achieves low leakage and also high performance without the complications and performance issues associated with dual core designs. Clocks 415 and 410 may be selected to drive devices in portion 405 and multi-Vt critical path 401 through corresponding switches In general, a critical path will include both combinatorial and sequential devices. The sequential devices store a current state for the critical path. In switching between the high performance and low power modes, the current state would need to be transferred as well. For example, a processor including multi-Vt critical path 100 of FIG. 1 that is switching from the low power mode to the high performance mode includes logic to transfer the state of high-Vt critical path 125 to the sequential devices in low-Vt critical path 115. Such logic may be implemented in hardware or software within the processor. To eliminate the need to transfer state, low-Vt critical path 115 could comprise only the combinatorial elements for path 100. Similarly, high-Vt critical path 125 may comprise only combinatorial elements.

Figure 5:
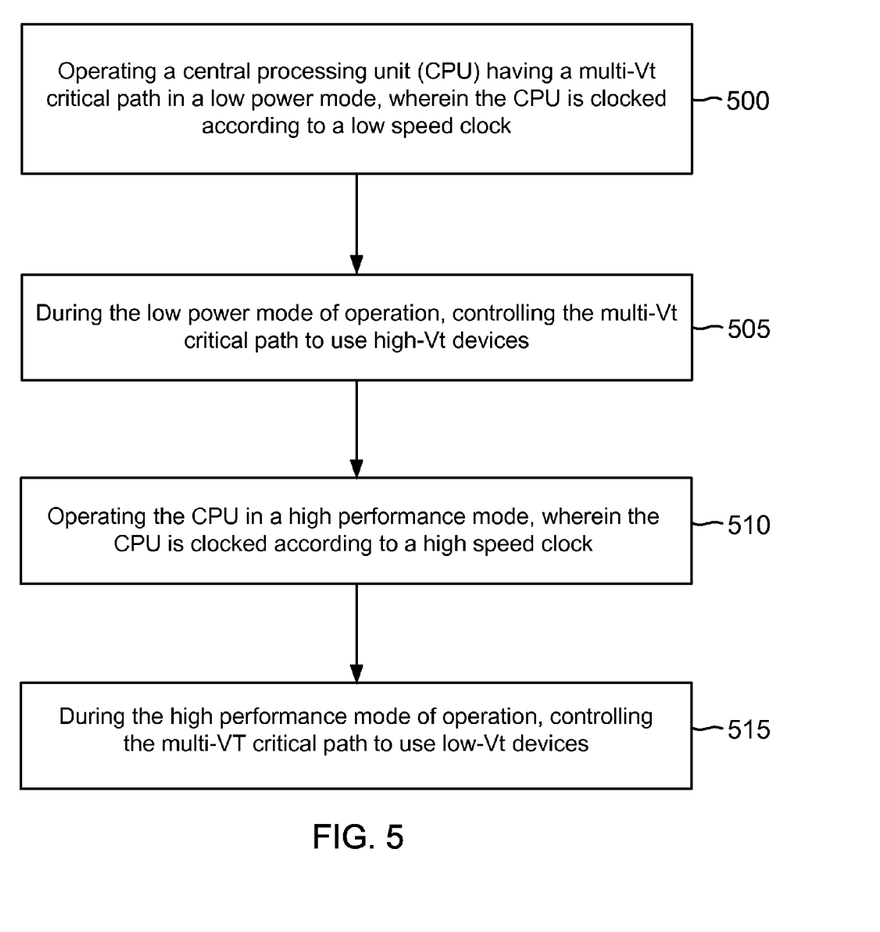
FIG. 5 is a flowchart for a method of operating a processor including a multi-Vt critical path.

FIG. 5 illustrates a flow chart for a method of operating a processor including a multi-Vt critical path. This method begins with a step 500 of operating a central processing unit (CPU) having a multi-Vt critical path in a low power mode, wherein the CPU is clocked according to a low speed clock. During the low power mode of operation, the multi-Vt critical path is controlled to use high-Vt devices in a step 505. In a step 510, the CPU operates in a high performance mode, wherein the CPU is clocked according to a high speed clock. During the high performance mode of operation, during the high performance mode, the multi-Vt critical path is controlled to use low-Vt devices in a step 515. In this fashion, the processor including the CPU can operate in both a high performance mode and in a low performance mode without the need for a corresponding high performance core and a low performance core.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A multi-mode critical path for a central processing unit (CPU), comprising:
   an initial storage cell;
   a final storage cell, wherein both the initial storage cell and the final storage cell are configured to be clocked by a high speed clock during a high performance mode for the CPU and to be clocked by a low speed clock during a low performance mode for the CPU, and wherein a frequency for the high speed clock is greater than a frequency for the low speed clock;
   a plurality of first logic gates configured to form a first signal path between the initial storage cell and the final storage cell, wherein the plurality of first logic gates are configured to be operational during the high performance mode and to be non-operational during the low power mode, the plurality of first logic gates comprising devices configured to have at least one of a first channel length and a first threshold voltage; and
   a plurality of second logic gates configured to form a second signal path between the initial storage cell and the final storage cell, wherein the plurality of second logic gates are configured to receive power during the low power mode and to not receive power during the high performance mode, the plurality of second logic gates comprising devices configured to have at least one of a second channel length and a second threshold voltage, wherein the second channel length is longer than the first channel length and the first threshold voltage is lower than the second threshold voltage.

2. The multi-mode critical path of claim 1, wherein the plurality of first logic gates are configured to couple to the initial storage cell and to the final storage cell through isolation circuits, each isolation circuit being configured to isolate the first logic gates during the low power mode.

3. The multi-mode critical path of claim 1, the first logic gates and the second logic gates both comprise combinatorial and sequential devices, and wherein the CPU comprises logic configured to transfer a state of the sequential devices in the second logic gates to the sequential devices in the first logic gates responsive to the CPU switching from the low power mode to the high performance mode.

4. The multi-mode critical path of claim 3, wherein the logic is further configured to transfer a state of the sequential devices in the first logic gates to the sequential devices in the second logic gates responsive to the CPU switching from the high performance mode to the low power mode.

5. The multi-mode critical path of claim 1, wherein the plurality of first logic gates and the plurality of second logic gates are exclusively combinatorial logic gates.

6. A multi-Vt critical path for a central processing unit (CPU), comprising:
   an initial storage cell;
   a final storage cell, wherein both the initial storage cell and the final storage cell are configured to be clocked by a high speed clock during a high performance mode for the CPU and to be clocked by a low speed clock during a low performance mode for the CPU, and wherein a frequency for the high speed clock is greater than a frequency for the low speed clock;
   a plurality of dual-mode logic gates coupled in a path from the initial storage cell and the final storage cell, wherein each dual-mode logic gate includes a first logic gate having at least one of a first channel length and a first threshold voltage and includes a corresponding second logic gate having at least one of a second channel length and a second threshold voltage, wherein the second channel length is longer than the first channel length and the first threshold voltage is lower than the second threshold voltage, and wherein each dual-mode logic gate is configured to isolate its second logic gate from the path and to couple its first logic gate to the path during the high performance mode and to isolate its first logic gate from the path and to couple its second logic gate to the path during the low power mode.

7. The multi-Vt critical path of claim 6, wherein each dual-mode logic gate includes a first PMOS transistor coupled between a power supply and the dual-mode logic gate's first logic gate, each first PMOS transistor having a gate coupled to an inverted mode control signal for selecting between the high performance mode and the low power mode such that the first PMOS transistors are configured to be switched on during the high performance mode and to be switched off during the low power mode.

8. The multi-Vt critical path of claim 7, wherein each dual-mode logic gate includes a second PMOS transistor coupled between the power supply and the dual-mode logic gate's second logic gate, the second PMOS transistors each having a gate coupled to a mode control signal such that the second PMOS transistors are configured to be switched on during the low power mode and to be switched off during the high performance mode.

9. The multi-Vt critical path of claim 8, wherein each dual-mode logic gate includes a first NMOS transistor coupled between the dual-mode logic gate's first logic gate and ground, and wherein each first NMOS transistor has a gate coupled to the mode control signal such that the first NMOS transistors are configured to be switched on in the high performance mode and to be switched off in the low power mode.

10. The multi-Vt critical path of claim 9, wherein each dual-mode logic gate includes a second NMOS transistor coupled between the dual-mode logic gate's second logic gate and the power supply, and wherein each second NMOS transistor has a gate coupled to the mode control signal such that the second NMOS transistors are configured to be switched off in the high performance mode and to be switched on in the low power mode.

11. A central processing unit (CPU), comprising:
   a high-Vt portion configured to be clocked responsive to a low speed clock during a low power mode for the CPU and to be clocked responsive to a high speed clock during a high performance mode for the CPU, wherein a frequency for the high speed clock is greater than a frequency for the low speed clock; and
   a multi-Vt critical path coupled between an initial storage cell and a final storage cell, the multi-Vt critical path including a plurality of first logic gates configured to be selected during the high performance mode such that the multi-Vt critical path functions as a low-Vt critical path during the high performance mode, the plurality of first logic gates comprising devices configured to have at least one of a first channel length and a first threshold voltage, the multi-Vt critical path further including a plurality of second logic gates configured to be selected during the low power mode such that the multi-Vt critical path functions as a high-Vt critical path during the low performance mode, the plurality of second logic gates comprising devices configured to have at least one of a second channel length and a second threshold voltage, wherein the second channel length is longer than the first channel length and the first threshold voltage is lower than the second threshold voltage, and wherein the initial storage cell and the final storage cell are configured to be clocked by the low speed clock during the low power mode and to be clocked by the high speed clock during the high performance mode.

12. The CPU of claim 11, wherein the plurality of second logic gates are each configured to be clocked responsive to the low speed clock during the low power mode.

13. The CPU of claim 11, wherein the plurality of first logic gates are each configured to be clocked responsive to the high speed clock during the high performance mode.

14. A method, comprising:
    operating a central processing unit (CPU) in a low power mode, wherein the CPU is clocked according to a low speed clock, the CPU including a multi-Vt critical path extending from an initial storage cell to a final storage cell;
    during the low power mode, controlling the multi-Vt critical path to use a plurality of second logic gates comprising devices configured to have at least one of a second channel length and a second threshold voltage while clocking the initial storage cell and the final storage cell according to the low speed clock;
    operating the CPU in a high performance mode, wherein the CPU is clocked according to a high speed clock; and
    during the high performance mode, controlling the multi-Vt critical path to use a plurality of first logic gates comprising devices configured to have at least one of a first channel length and a first threshold voltage while clocking the initial storage cell and the final storage cell according to the high speed clock, wherein a frequency for the high speed clock is greater than a frequency for the low speed clock, and wherein the second channel length is longer than the first channel length and the first threshold voltage is lower than the second threshold voltage.

15. The method of claim 14, wherein controlling the multi-Vt critical path to use the plurality of first logic gates comprises asserting a mode control signal.

* * * * *